Patented July 20, 1937

2,087,853

UNITED STATES PATENT OFFICE 2,087,853

COMPOSITION COMPRISING A PHENOLIC RESIN AND PROCESS OF MAKING SAME

Carleton Ellis, Montclair, N. J., assignor to Ellis-Foster Company, a corporation of New Jersey No Drawing. Application November 4, 1932, Serial No. 641,232

4 Claims. (Cl. 134—26)

In Serial 751,867 filed Nov. 24, 1924, and related applications, such as Serial 578,219 filed Nov. 30, 1931, I have disclosed methods of making resins by reaction between aldehydes and xylenols or coal tar fractions containing an influential proportion of xylenols.

One utilization of these xylenitic resins is in the production of varnishes by incorporation with drying oils. Thus Serial 578,219 states:

The oil-soluble resin may be made by reacting xylenol and acetaldehyde as follows:

*Example 1.*—61 parts by weight xylenol fraction boiling point 205–212° C.
25 parts paraldehyde
1 part orthophosphoric acid The phosphoric acid was added to the xylenol and the mixture heated to about 45° C., and the paraldehyde introduced very gradually over a period of ½ hour. The heat was cut off almost immediately after beginning to introduce the paraldehyde and the temperature rose spontaneously to about 60° C. The product was washed to remove the free phosphoric acid and dried. On cooling a brownish, hard resin was obtained. 1 part of this resin was found to dissolve readily in, for example, 4 parts of linseed oil at a temperature of about 75° C. The resin also is soluble in tung oil. Thinners such as turpentine, and the like, may be added, also driers as required.

In view of the temperature increase in the production of the resin some provision when working on the large scale for cooling the reaction product in the making should be applied in most cases.

Acetaldehyde likewise reacts with certain xylenol derivatives to give oil-soluble resins (by the term "oil-soluble" from the standpoint of the present invention the glyceride oils such as the drying and semi-drying oils, and the like, are intended).

*Example 2.*—232 parts by weight acetone
5 parts by weight concentrated hydrochloric acid
976 parts by weight of crude xylenol, boiling range 205–225° C.

were heated under a reflux condenser for 12 hours yielding a heavy viscous oil. The reaction was directed to the formation of dihydroxydixylyldimethylmethane.

To 100 parts of said heavy viscous oil without purification 50 parts of paraldehyde were added gradually over a period of about ½ hour, the temperature being carried to 80–100° C. The reaction product was washed and dried resulting in obtaining a soft resin which was almost completely soluble in hot linseed or tung oil or mixtures of these.

In coating compositions of the varnish type made from xylenol acetaldehyde resin, an oil of the linseed and tung oil type, a drier and a thinner, I may secure a resinous component of a somewhat higher melting point by reacting on the xylenol acetaldehyde resin in solution in a drying oil by a reagent such as formaldehyde or hexamethylenetetramine, heating the composition until the desired degree of hardness occurs without sacrifice of solubility of the product. In this way a composite resin of the acetaldehyde formaldehyde type dissolved in the linseed oil, tung oil, and the like, with suitable thinners, such as turpentine, is obtained which tends to give harder coatings on drying than those which have not received the formaldehyde hardening treatment. In like manner coating compositions may be made without the addition of hexamethylenetetramine, paraform, and so forth, then the hardening agent added and the coating applied and baked at a reactive temperature to cause hardening to set in in the coating, to convert the resin to the desired degree.

In Serial 383,167, filed Aug. 2, 1929, which considers among other matters the employment of mixed aldehydes obtained for example by the oxidation treatment of natural gas and the like, I have noted the step of removal from the resin of unreacted components and bodies of unpleasant odor as follows:

I preferably blow with air or steam or inert gas at a temperature above 100° C. to de-acridify. At the same time I am able to remove excess of xylenol or other phenolic body and this frequently is desirable, especially when a resin is being made for use in the oil varnish industry where the presence of free phenolic bodies might tend to retard drying.

When the de-acridification step is complete the resin may be made into a molding composition by incorporating with the various fillers used in the plastic industry and with the addition of hexamethylenetetramine or other hardening agent and hot pressed. Or the clear resin, with or without some added hardening agent, may be slowly baked over a long period to form various amber substitutes, and the like, which may be machined to form cigarette holders, beads, umbrella handles, and so forth. Or a solution may be made from the resin by dissolving it in a solvent mixture such as alcohol-benzol and the latter employed for impregnation, for example, of paper or cloth and the dried impregnated sheets hot pressed to form laminated sheet, fiber board, gear blanks, and the like. Or the resin may be heated with rosin to a temperature between 200°–300° C. using an excess of rosin and finally esterifying with glycerol, glycol, diethylene glycol, and the like, to form oil soluble resins which may be used in making varnishes.

Acetaldehyde forms with phenolic bodies a resin having somewhat different properties from that obtained by the use of formaldehyde. By reacting on a phenol with a mixture of formaldehyde and acetaldehyde a complex is secured which is eminently desirable. Using the crude mixed aldehydes from natural gas oxidation containing a major proportion of formaldehyde and a minor proportion of acetaldehyde I am able to secure co-reacted products or complexes relatively low in cost and having properties substantially those of resins made from raw materials costing considerably more.

The present invention is based in part at least on such disclosures and is further illustrated by the following examples:

*Example 3.*—2000 parts by weight of xylenol distillate with boiling range from 210–225° C. was heated with 1000 parts of 37% aqueous formaldehyde solution in a vessel provided with a reflux condenser. Water was then boiled off and the temperature raised to 110° C. A soft resin of strong phenolic odor was obtained. This soft resin was heated to 160° C. and blown with steam at approximately this temperature for 3½ hours. When cold the resulting resin was hard, light in color and dissolved in hot tung oil. It was well de-acridified, being practically free of odor.

From 500 parts of the soft resin the steam-blowing or steam-distillation yielded 107 parts of an oily liquid heavier than water. This oily liquid was separated from the aqueous portion of the distillate and from various tests appeared to consist in large measure of 1,3,4-xylenol.

*Example 4.*—Instead of steam-stilling the soft resin of Example 3, 1000 parts were heated to 230° C. and held at this temperature for about 5 minutes. On cooling, the resin was hard, possessed about the same color as the steam-stilled hard resin of Example 3, and dissolved in tung oil on heating, but exhibited a strong phenolic odor. This odor was quite apparent despite the fact that the resin during the heating had lost 210 parts in weight.

*Example 5.*—The heat-hardened resin of Example 4 was blown with steam at 155° C. for about 2 hours. Complete deodorization resulted. The resin thus obtained was easily dissolved in tung oil on heating together at about 125° C. The resins of Examples 3 and 4 dissolved in tung oil when heated with the oil to a higher temperature, 225° to 230° C. being suitable.

Other xylenol-containing fractions of coal tar acids may be used, for example a fraction boiling between 205° and 220° C. Also the pure xylenols themselves may be employed. Thus, sym.-xylenol can be obtained from the crude xylenol mixture by close fractionation in the neighborhood of 219° C., or it can be isolated from higher-boiling xylenol fractions by means of its sodium salt which is sparingly soluble in water.

*Example 6.*—A crude mixture of xylenols was distilled and the fraction boiling between 218° and 223° C. was collected. This was treated with sodium hydroxide solution and the sodium salt which separated was washed and converted to the free xylenol by adding sulphuric acid to a dilute aqueous solution of the salt. 80 parts sym.-xylenol thus obtained, 48 parts 37% formaldehyde and 24 parts 30% aqueous ammonia were mixed and heated to boiling. Water was poured off from the oily layer which separated. Heating the oily material to 118° C. gave a soft resin which dissolved in tung oil when the latter was heated to about 200° C. In order to de-acridify the resin it may be heated to about 150° C. and steam-distilled as was done in Example 3.

1,3,4-Xylenol obtained by steam distillation of Example 3 is also an example of a pure xylenol which may be used in forming resins.

*Example 7.*—100 parts 1,3,4-xylenol, 67 parts 37% formaldehyde and 1 part sodium hydroxide were mixed and gently warmed. An exothermic reaction occurred and a light-colored resin separated. The water layer was poured off, after which the resin was washed to free it from alkali and heated to 120° C. A hard light-colored resin was obtained.

*Example 8.*—250 parts xylenols distilling between 205° and 220° C. were mixed with 265 parts of a 25% solution of formaldehyde obtained by oxidation of natural gas. The mixture was allowed to stand for 4 days and was then heated to 115° C. in order to drive off all water. A soft resin containing some unreacted xylenols was obtained. This was soluble in tung oil. The unreacted xylenols may be removed by steam distillation and the resin thereby hardened and de-acridized.

Instead of dissolving the xylenol resins in raw drying oils I may use boiled or blown oils, or oils otherwise heat-treated prior to incorporation of the resins. Also, I may dissolve the resins in raw tung oil and the like and then add a bodied drying oil such as boiled perilla oil. One part of the resin of Example 8 was dissolved in 2 parts tung oil by heating the mixture to 250° C. Then 3 parts bodied linseed oil was added and a clear solution was obtained.

As pointed out above, the phenol aldehyde resins of this invention may be fused with rosin or rosin ester, or with other natural resins and natural resin esters. Also they may be fused with, or used in conjunction with, synthetic resins such as are obtained by the action of aluminum chloride on distillates of the vapor-phase cracking of petroleum. (See for example U. S. Patent No. 1,836,629). Such petroleum resins used alone give very rapid drying varnishes; however, these varnishes possess certain defects. An insoluble precipitate may form when they are thinned and this must be removed by filtration or decantation in order to get a clear, marketable product. The varnishes skin-over rapidly when stored. Also there is a tendency for tung oil varnishes to form opaque, frosted films during drying unless a very high temperature is used in their preparation. A mixture of a phenol resin such as Example 3 and petroleum resin in suitable proportions yields a varnish which has none of the defects such as are present when the petroleum resin is used alone. Thus, addition of 10 per cent of the resin of Example 3 to the petroleum resin prevents frosting of a tung oil varnish made from the mixture, and reduces the skinning-over tendency. 1 part xylenol resin to 2 parts petroleum resin forms a varnish which shows only slight sedimentation. Mixtures of petroleum resin and xylenol resin form varnishes which dry faster than when xylenol resin is used alone.

The petroleum resin as described above also may be used with phenol resins which ordinarily are of low oil-solubility. Thus, a mixture of petroleum resin and phenol or cresol resin may be used to form a varnish.

*Example 9.*—100 parts m-p-cresol and 56 parts 37% formaldehyde solution were heated under a reflux condenser for 5 hours. Water was then distilled off and the resin heated to 200° C. for 5 minutes. A hard brittle resin was obtained which was only slightly soluble in drying oils. Equal parts of the cresol and petroleum resin were heated to 240° C. A turbid melt formed at first and heating at 240° C. was continued until the fused mass was practically clear. The composite resin thus obtained was soluble in tung oil. It may be steam-distilled if desired in order to de-acridify it. The two components of the composite resin also may be dissolved in tung oil without preliminary fusion of the mixture.

The following examples are given in order to indicate more fully the conditions involved in the process of de-acridifying resins according to this invention.

*Example 10.*—10 lbs. xylenols (210-225° C. fraction) and 5 lbs. 37% formaldehyde were heated under a reflux condenser for 2 hours. Water was then distilled from the mixture and the temperature was taken to 150° C. during 3 hours. Then steam was passed through the fused resin. Within a short time after introduction of steam the mass became viscous and showed signs of gelatinization. Steam was shut off and by careful heating, as not to overheat the resin locally and cause discoloration, the resin was converted to a freely mobile condition at about 180° C. This was then steam-distilled for 5 hours and the product was substantially free from odor and soluble in tung oil.

*Example 11.*—Another batch of resin was made using the same quantities of materials as in Example 10, but the temperature of the reaction mixture was increased more rapidly after removal of the water; and steam was not introduced until the temperature of the resin had reached 180° C. Thus, after distillation of water, the temperature was raised to 180° C. during 3 hours and steam was then passed in. The resin remained in a fluid condition and after steam distilling for 6 hours the product was completely de-acridified.

If steam-treatment of the resin in Example 10 is continued after gelatinization has started, an infusible product is likely to be obtained. This may be converted into a fusible oil-soluble resin by fluxing with xylenol.

*Example 12.*—The reaction of Example 10 was carried out and the resin heated to 150° C. after distilling off the water, as indicated. Steam was then passed into the mass for one-half hour. An infusible gel was obtained. This was converted to a fusible resin as follows: 1 lb. xylenols (210-225° C. fraction) was heated to 180° C. and 7½ lbs. of the gelatinized resin was added gradually over a period of 4 hours, keeping the temperature at about 180° C. After all the gel had been introduced the mixture was heated 3 hours longer and a mobile solution of resin in a lesser proportion of xylenol was obtained. Steam distillation as in Example 11 served to remove excess xylenols and resulted in a fusible, hard, brittle, oil-soluble resin.

In the process of steam-distillation in order to deacridify an oil-soluble phenolic resin, another advantage lies in the fact that a light colored resin is obtained even when moderately dark-colored xylenols are involved. This is explainable on the ground that air, with concomitant oxidation, is excluded during a large part of the time the resin is heated, and also that certain color-producing bodies are volatilized or decomposed during the distillation. In one case xylenols of straw color were used; in another case, freshly distilled almost water-white xylenols. The resins obtained from these two materials were pale yellow, oil-soluble resins of practically the same color.

In this manner a de-acridified, de-xylenated oil-soluble phenol-aldehyde resin is obtained. The step of heating a xylenol formaldehyde resin containing free xylenol for a sufficient period serves to make it gel-resistant on de-xylenating, whereupon the free xylenol may be removed by distillation at atmospheric pressure or at pressures above or below atmospheric or by blowing with steam either at atmospheric pressure or at pressures above or below atmospheric. It may be noted that the term de-acridifying involves the step of removing not only free xylenol but any accompanying nitrogenous or other bodies of acrid odor.

What I claim is:

1. A solution of a reaction product of a ketone, xylenol, and an aldehyde in a drying oil.
2. A solution of a reaction product of acetone, xylenol and an aldehyde in a drying oil.
3. A solution of a reaction product of acetone, xylenol and acetaldehyde in a drying oil.
4. A solution of a reaction product of acetone, xylenol and formaldehyde in a drying oil.

CARLETON ELLIS.